Aug. 1, 1944.   P. VON ROHL   2,354,785
MAP
Filed June 25, 1942

Inventor
Paul von Rohl
By Robert M. Dunning
Attorney

Patented Aug. 1, 1944

2,354,785

UNITED STATES PATENT OFFICE 2,354,785

MAP

Paul von Rohl, St. Paul, Minn.

Application June 25, 1942, Serial No. 448,349

9 Claims. (Cl. 35—40)

My invention relates to an improvement in maps, wherein it is desired to provide a map of the entire world which is visible at a single glance, and which at the same time may show the relationship between the various parts of the world.

Maps showing the entire world are of two general types, one of which includes spherical maps or globes, and the other of which is flat and which shows the entire surface of the world at a glance. The maps which are printed upon spherical surfaces show the true relationship of the various countries and continents. If the usual rectangular map of the world is employed, the true relationship of the parts of the earth are not shown, due to the fact that the various continents are widely spaced at the upper and lower extremities of the map. For example, in the usual rectangularly arranged map, Alaska may appear at a considerable distance from Siberia, while on a globe these lands are considerably closer together. In other words, the map must be distorted considerably, particularly along the upper and lower edges of the map and do not show the true relationship between the various continents. Certain maps have been printed which show the Eastern and Western Hemispheres on circular discs, which show a truer relationship between the continents and countries within the Eastern Hemisphere and within the Western Hemisphere. With such circular maps, however, the relationship between the two hemispheres is not clearly indicated.

It is the object of the present invention to provide a pair of maps, each showing a section equal to one-half of the area of the world and to so mount these maps that the true relationship between the continents and countries of the world may be readily noted. This I accomplish by mounting the two circular maps side by side and rotatably supporting the maps to rotate in unison. As a result the true relationship between any parts of the map may be determined at a glance.

A feature of the present invention lies in the fact that the two halves of the world may be rotated so that any portion of the world, a part of which is shown on each section of the map, may be placed into adjacent relationship. For example, if the map is arranged to show the Eastern and Western Hemispheres, a part of Siberia is ordinarily shown in each hemisphere. By rotating the disc-shaped maps in unison, the parts of Siberia appearing on the Eastern and Western Hemispheres may be connected so as to show the true relationship between these parts of the world.

A feature of the present invention resides in a means for rotating the two map sections in unison so that corresponding portions of the earth's surface are at all times in proper relationship. This provision obviates the necessity of manually rotating the discs in unison and is advantageous in the operation of the map.

A further feature of the present invention resides in the rotating of one map section in a direction opposite to the rotation of the other map section so that adjacent portions of the world, as indicaed by the map sections, are always in adjacent relationship.

These and other objects and novel features of my invention will be more clearly and fully set forth in the following specification and claims.

In the drawing forming a part of my specification:

Figure 1:
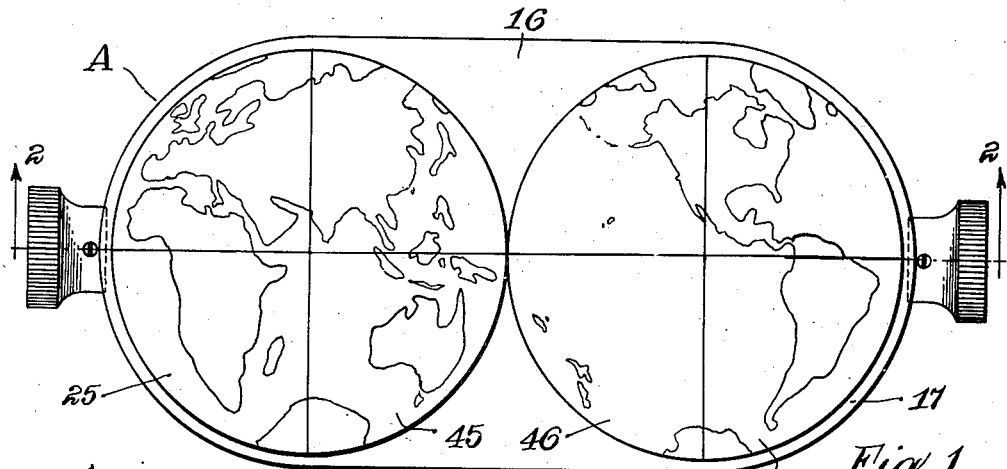
Figure 1 is a top plan view of the map showing the relationship between the two map sections.

The map A in preferred form is mounted upon a base 10, which may include a layer of felt, or other material 11 to prevent the base from marring the surface upon which the same may rest. A generally oval-shaped frame 12, which will be later described in detail, is provided with a circular disc 13 mounted at its lower extremity which is connected to the frame by any suitable means. In the form of construction illustrated a cross brace 14 is provided forming a part of the frame, and the disc 13 is secured to the lower surface thereof. A pivot bolt or screw 15 extends through the cross member 14, through the disc 13, and into the base 10, to secure the base to the frame 12. This bolt or screw 15 forms a pivot which permits relative rotation between the disc 13 and the frame 12 and the base 10, allowing the entire frame to swing about the base 10.

The frame 12 comprises a flat top 16 which is generally oval in shape or which is elongated and provided with rounded ends. A depending side wall portion 17 extends downwardly from the top 16 to include the operating mechanism which will be later described. The depending skirt or side wall portion 17 includes a pair of semi-circular end walls 19 and 20 and connecting side walls 21 and 22 extending between and connecting the end walls 19 and 20. The top 16 may include a beaded edge 23 which extends beyond the perimeter of the depending side wall 17 for decorative purposes. The cross brace 14 extends between the opposed side walls 21 and 22 and is further supported by vertical braces such as 24 which extend between the upper surface of the cross brace 14 and the frame top 16 adjacent each side wall 21 and 22. This frame construction is only illustrative of a suitable construction which may be used for supporting the map sections and may be varied within the scope of the appended claims.

A pair of map sections 25 and 26 are secured to disc-like flanges 27 and 29 mounted on vertical shafts 30 and 31 extending through the frame top 16. The flanges 27 and 29 may be secured to the discs 25 and 26 by any suitable means such as by the screws 32. Obviously other means could be used for connecting the shafts 30 to the discs 25 and 26 for rotation in unison.

The shafts 30 and 31 are so spaced that the peripheries or the discs 25 and 26 come into contact or into substantial contact at a point intermediate the two shafts. Thus the discs are held so that portions of the discs are always in adjacent relationship. Bevel gears 33 and 34 are mounted upon the shafts 30 and 31 respectively, being spaced below the top 16, if desired, by suitable spacing washers such as 35.

Figure 2:
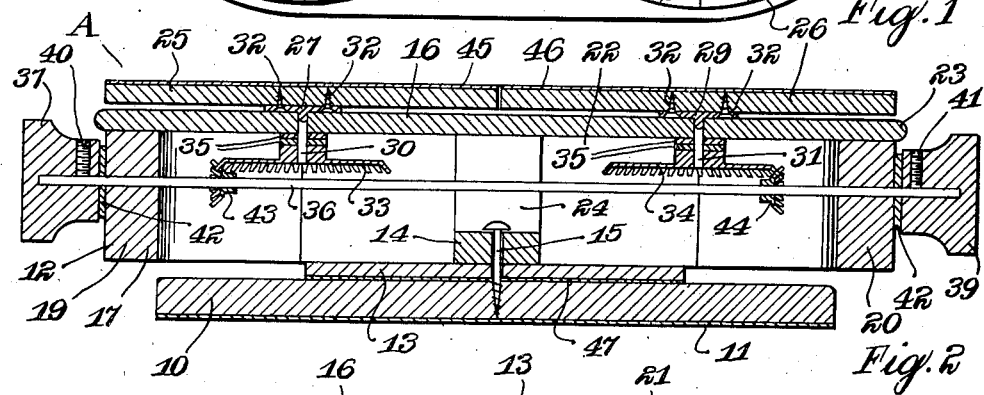
Figure 2 is a vertical section through the map and support, the position of the section being indicated by the line 2—2 of Figure 1.
Figure 3:
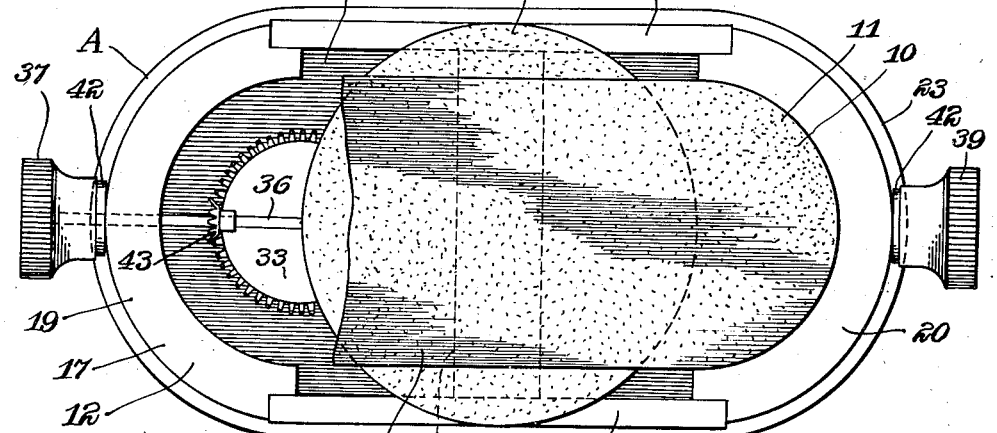
Figure 3 is a bottom plan view of the map and supporting structure, a portion of the base of the map being broken away to illustrate a portion of the operating mechanism.

A shaft 36 extends longitudinally of the frame 17 and extends through the end wall members 19 and 20 as illustrated in Figures 2 and 3 of the drawing. Operating knobs 37 and 39 are mounted upon opposite ends of the shaft 36, being secured to rotate with the shaft by any suitable means, such as the set screws 40 and 41, respectively. Felt spacing washers 42 may be provided between the knobs 37 and 39 and the adjacent end wall sections 19 and 20 if it is so desired.

Mounted upon the shaft 36 for rotation therewith, I provide a pair of beveled gears 43 and 44. These gears 43 and 44 engage opposite sides of the bevel gears 33 and 34. In the modification shown the gears 43 engage the side of the bevel gears 33 and 34 farthest spaced from the center of the frame. These gears 43 and 44 could both engage the most closely adjacent edges of these gears if it were so desired. It is necessary, however, to the proper operation of the present device that the shaft 30 rotate in the opposite direction from the shaft 31, so that when the disc 25 rotates in a clockwise direction the disc 26 will rotate in a counter-clockwise direction, and vice versa.

In operation the map sections 25 and 26 are either printed upon their discs or may be formed in separate layers, such as 45 and 46 and adhered to the top or upper surface of the discs 25 and 26. These maps are so arranged in one relative position thereof, that the equators shown on the two sections are in alignment, and are so further arranged that the North Pole of one map is adjacent the North Pole of the other map in one adjusted relation of the maps. Then by rotation either the knob 37 or the knob 39, or by rotation of both of the knobs in unison, the discs 25 and 26 are rotated in unison so that any portion of one hemisphere may be pivoted into contacting or adjacent relationship to a corresponding point of the other map. For example, the maps may be rotated until the North Pole coincides, or until the South Pole coincides, and in this relationship the adjacent areas are shown in their proper relationship. In Figure 1 of the drawing, the two hemispheres are shown with the equator line of one hemisphere aligned with the equator line of the other hemisphere.

It will be understood that various means may be employed for rotating the map supported discs in unison, it being understood that one disc should rotate in a clockwise direction, while the opposite disc rotates in a counter-clockwise direction.

It should be understood that the discs 24 and 26 could be hemispheres if it was so desired, these hemispheres being mounted with the flat surface thereof lowermost and the curved surface thereof uppermost. The same relation would apply in this instance as if the map representations 45 and 46 were flat, as illustrated.

If it is desired a sheet of felt or other suitable material indicated by the numeral 47 may be secured to the lower surface of the disc 13 so as to form a friction surface to bear against the top of the base 10. This provides a large flat bearing surface which will permit rotation, but which will hold the frame 12 in any desired position.

In accordance with the patent statutes, I have described the principles of construction and operation of my map, and while I have endeavored to set forth the best embodiments thereof, I desire to have it understood that obvious changes may be made within the scope of the following claims without departing from the spirit of my invention.

I claim:

1. A map comprising a pair of discs of equal diameter, map representations on said discs, one of said map representations showing the eastern hemisphere, the other showing the western hemisphere, means mounting said discs with the map representations thereof on a substantially single plane with the periphery of said discs in peripheral contact, and means for rotating said discs in unison.

2. A map device comprising a pair of map representations circular in outline of equal diameter, means axially rotatably supporting said representations, said axes extending substantially parallel, and the circular outlines of said representations in peripheral contact, means connecting said representations to rotate the same in unison but in opposite directions, and manually operable means for operating said connecting means.

3. A map including a pair of discs of equal diameter each having a map representation thereupon, one of said disc maps showing the eastern hemisphere, and the other disc map showing the western hemisphere, and means rotatably mounting said discs in peripheral contact, said mounting means supporting said discs with the map representation surfaces thereof substantially on a single plane.

4. A map device comprising a pair of discs of equal diameter, a map representation of the eastern hemisphere on one of said discs, a map representation of the western hemisphere on the other of said discs, a base, and means extending through said base connected axially to said discs to support the same rotatable in peripheral contact, said means supporting said discs with the upper surface thereof on a single plane.

5. A map device comprising a base, a pair of flat discs of equal diameter having a map representation thereon rotatably secured to said base, one of said disc maps showing the eastern hemisphere and the other showing the western hemisphere, pivot means axially connecting said flat discs to said base, said pivot means mounting said discs on substantially a single plane in contacting relation and spaced closely adjacent the upper surface of said base, said base underlying the entire area of said discs.

6. A map device comprising a base plate having rounded ends, a pair of discs of equal diameter having map representations thereon, one of said disc maps showing the eastern hemisphere and the other showing the western hemisphere, and pivot means coaxial with said discs and said rounded ends of said base, said pivot means supporting said discs on substantially the same plane and in closely adjacent relation to the surface of said base, said base underlying the entire area of the discs.

7. A map device comprising a base plate, a pair of parallel spaced pivots extending through said base plate, a disc bearing a map representation secured to one end of each of said pivots, said discs being of equal diameter, said pivots supporting said discs on substantially the same plane, one of said disc maps showing the eastern hemisphere and the other showing the western hemisphere, a gear secured to the other end of each of said pivots, a skirt depending from said base plate, a shaft extending through said skirt, and gear means on said shaft engaging said gears on said pivots to cause rotation of said pivots in unison but in opposite directions.

8. A map device comprising a base plate, a pair of parallel spaced pivots extending through said plate plate, a disc bearing a map representation secured to one end of each of said pivots, said discs being of equal diameter, said pivots supporting said discs on substantially the same plane, one of said disc maps showing the eastern hemisphere and the other showing the western hemisphere, a gear secured to the other end of each of said pivots, a skirt depending from said base plate, a shaft extending through opposite ends of said skirt, gear means secured to said shaft and engaging each of said gears on said pivots whereby to rotate said discs in opposite directions, and means on each end of said shaft by which said shaft may be rotated.

9. A map device comprising a casing, a pair of discs of equal diameter pivotally secured to said casing, pivotal supports for said discs holding the same in substantially contacting relation and on substantially a single plane, a map representation on each of said discs, one of said disc maps showing the eastern hemisphere and the other showing the western hemisphere, a bottom member on said casing, a base upon which said bottom member rests, and pivot means connecting said base and said bottom member.

PAUL von ROHL.